United States Patent
Ko

(10) Patent No.: US 6,772,417 B1
(45) Date of Patent: Aug. 3, 2004

(54) METHOD FOR PROCESSING RECEIVING MESSAGE OF MONITOR TERMINAL IN COMMUNICATION OPERATING SYSTEM

(75) Inventor: Hyuk-Jin Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 09/656,738

(22) Filed: Sep. 7, 2000

(30) Foreign Application Priority Data

Sep. 10, 1999 (KR) ........................................ 1999-38792

(51) Int. Cl.[7] ................................................ G06F 3/00
(52) U.S. Cl. ..................... 719/313; 719/330; 709/220; 709/224
(58) Field of Search ........................... 709/313, 330, 709/220, 224; 719/313

(56) References Cited

U.S. PATENT DOCUMENTS

| | | | | |
|---|---|---|---|---|
| 5,812,852 A | * | 9/1998 | Poulsen et al. | 717/149 |
| 5,926,636 A | * | 7/1999 | Lam et al. | 709/313 |
| 5,935,216 A | * | 8/1999 | Benner et al. | 709/248 |
| 6,101,540 A | * | 8/2000 | Graf | 709/224 |
| 6,101,556 A | * | 8/2000 | Piskiel et al. | 709/313 |
| 6,167,457 A | * | 12/2000 | Eidson et al. | 709/328 |

* cited by examiner

Primary Examiner—Meng-Al T. An
Assistant Examiner—Phuong N. Hoang
(74) Attorney, Agent, or Firm—Fleshner & Kim, LLP

(57) ABSTRACT

A method for processing a received message of a monitor terminal in a communication operating system is disclosed. It preferably generates a whole function related to processing a received message by a first module through a fourth module by using a script engine. Additionally, it parses the received message by using the first module to determine a message processing function to be called in the third module, and generates a real argument to be passed to the message processing function on the basis of the information of the second module. Next, it calls the message processing function and formats the data related to the system operating on the basis of the message processing function of the called third module and the fourth module information and storing it. The data, as classified and reorganized by parsing the received message, is organized as an argument on the basis of the information of the argument database module, which is passed to the corresponding message processing function when it is called. Thus, there is no need to re-parse in order to obtain a required data when the function processes the message, resulting in that the function of the message function is simplified.

22 Claims, 5 Drawing Sheets

METHOD FOR PROCESSING RECEIVING MESSAGE OF MONITOR TERMINAL IN COMMUNICATION OPERATING SYSTEM

BACKGROUND OF THE INVENTION

1. Field of the Invention

The present invention relates to a communication operating system, and more particularly, to a method for processing a receiving message of a monitor terminal.

2. Background of the Related Art

A monitor terminal is a device for recognizing an operation state of a data processing system or a transmission system. In order for the monitor terminal to recognize the operation state of the transmission system, a common information exchanging method is required, for which a massaging method is typically used.

There are three types of messages that are received and transmitted between the monitor terminal and the transmission system: (1) a command message transmitted by the monitor terminal to the transmission system; (2) a command response message transmitted by the transmission system in response to the command message; and (3) an automatic report message, which the transmission system sends automatically to inform the monitor terminal of its own state variation.

The command message is transmitted in a row string form, while the command response message and the automatic report message are received by the process of (1) message parsing; (2) command response processing function calling; and (3) passing the parsed information over the function argument.

FIG. 1 is a view showing a construction of a related art general system of a monitor terminal. The monitor terminal 20 includes a received message processing block 21 to receive a message transmitted from a communication operating system 10. It further includes an operational data managing block 22, to convert the received message to a software form suitable to be driven in the monitor terminal 20, and a monitor terminal operating data block 23 to store the operation data converted by the operational data managing block 22.

A user command inputting block 24 is next provided to receive a command from an operator, and a graphic user interface managing block 25 is provided to read out corresponding operational data from the monitor terminal operating data block 23 according to a command inputted by the user command inputting block 24. The terminal 20 also includes a transmittal message managing block 26 to transmit the message received from the graphic user interface managing block 25 to the communication operating system 10.

FIG. 2 is a flow chart of a method for processing a received message of a related art general monitor terminal. As shown in FIG. 2, when a command response message or an automatic report message is transmitted from the communication operating system 10, the operational data managing block 22 of the monitor terminal 20 receives the message through the received message processing block 21, as shown in step ST1. It then recognizes the message type by performing a message parsing, as shown in step ST2.

Upon recognizing the type of message, the monitor terminal 20 calls a command response processing function corresponding to the message type while passing the parsed information over the function argument to the called command response processing function, as shown in step ST3. The corresponding command response processing function, as called, the maps the received message in a string form with operational data in a form suitable for a software system (for example, a graphic user interface (GUI) system) that is driven in the monitor terminal 20, as shown in step ST4, and stores the operational data of the mapping result in the monitor terminal operating data block 23, as shown in step ST5.

In this manner, the monitor terminal 20, upon receipt of the message, performs the three steps of message parsing, command response processing function calling, and passing the parsed information over the function argument.

The related art system has various disadvantages. For example, although each of these three steps can be completely separated functionally and can be automated, since there is no suitable system structure available currently, whenever a new monitor system is developed, software must be rewritten to separate each of the three steps, thus causing users' inconvenience.

In addition, the parsing information passed as a function argument is limited in that only the message type is recognized. Accordingly, the message has to be re-processed in the command response process function.

Moreover, when adding or deleting a command message, its corresponding changed matters must be corrected one by one on the source code, which causes inconvenience.

Furthermore, since the software does not have a module structure, it cannot satisfy an optimal time complexity and an optimal space complexity, which is a general requirement for an embedded system environment.

The above references are incorporated by reference herein where appropriate for appropriate teachings of additional or alternative details, features and/or technical background.

SUMMARY OF THE INVENTION

It is an object of the present invention to provide a method for processing a received message of a monitor that substantially obviates the problems caused by the disadvantages of the related art.

Another object of the present invention is to effectively process a message transmitted from a communication operating system.

To achieve these and other advantages in whole or in parts, there is provided a method for processing a received message of a monitor terminal including the steps of generating a first, a second a third and a fourth modules for a whole function related to processing a received message by using a script engine; parsing a received message by using the first module when the message is received from the communication operating system, to determine a message processing function to be called in the third module, generating a real argument to be passed to the message processing function on the basis of the information of the second module, and calling the message processing function; and reorganizing the data related to the system operating on the basis of the message processing function of the called third module and the fourth module information and storing it.

To further achieve these and other advantages in whole or parts, there is provided a method for processing a received message of the monitor terminal including a first step of receiving a message script file and automatically generating a message parsing module, an argument database module, an interface function module and an interface data module; a second step of parsing a received message by the message parsing module when the message is received from the communication operating system to determine a message processing function to be called among a plurality of message processing functions included in the interface function module, and generating a data to be passed to the message processing function as determined and then calling the message processing function; a third step of mapping the data according to the message processing with the operational data in use for the software system of the monitor terminal by using the data as it is as transmitted from the message parsing module without re-parsing it; and a fourth step of storing the data as resulted by mapping in the operational data block of the monitor terminal.

An object of the invention is to solve at least the above problems and/or disadvantages and to provide at least the advantages described hereinafter.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
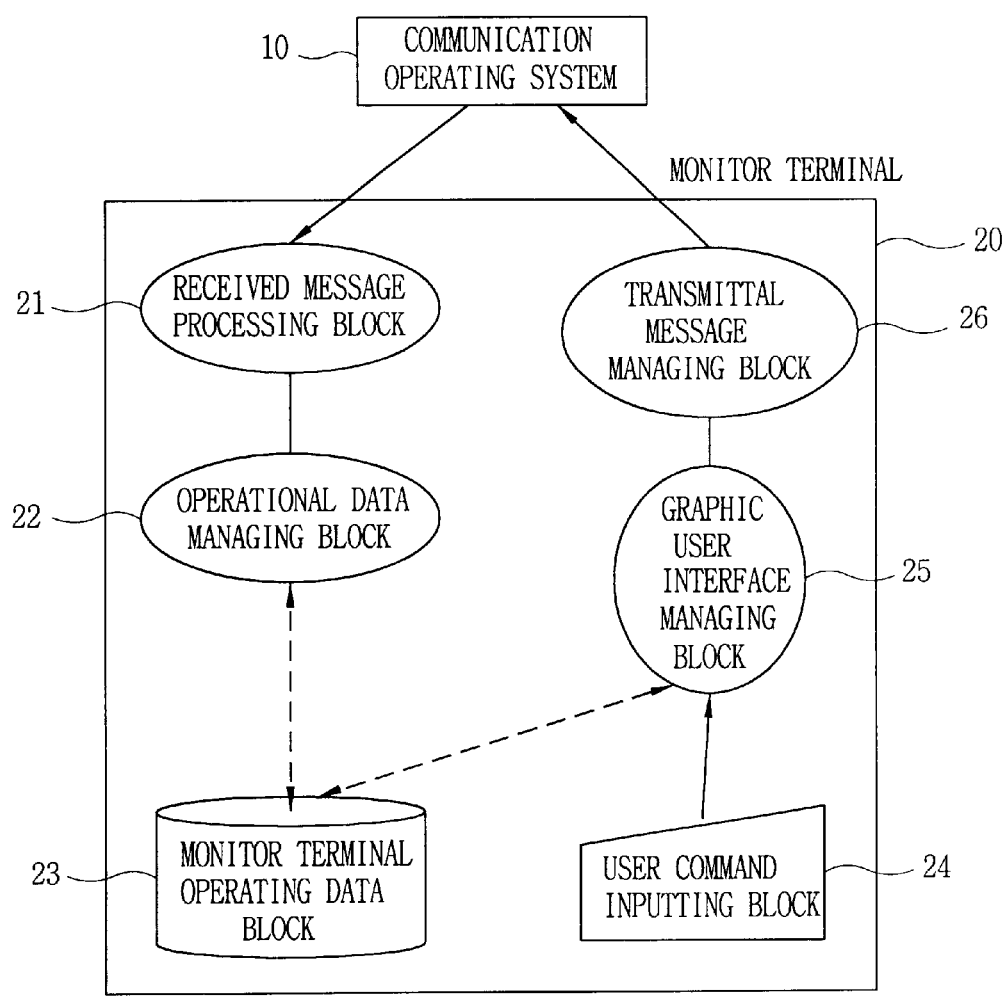
FIG. 1 is a block diagram showing an example of a related art system of a general monitor terminal.
Figure 2:
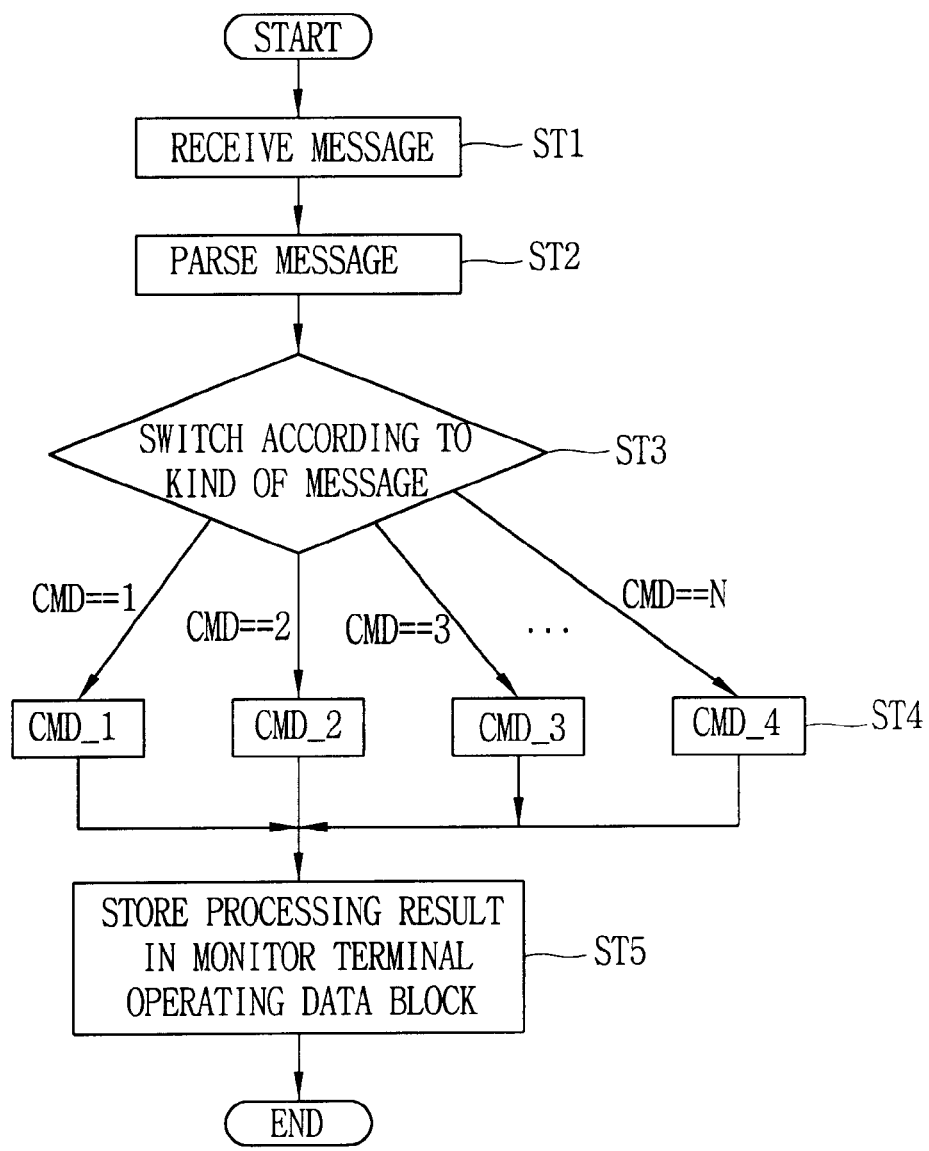
FIG. 2 is a flow chart illustrating a method of processing a received message of the monitor terminal in accordance with the related art.

The monitor terminal in accordance with a preferred embodiment of the present invention has the same layout as that shown in FIG. 1, but has a different function and operation. For example, a message is received to the received message processing block 21 from the communication operating system 10 and the received message is reorganized in the operational data managing block 22 to a format suitable to a system operating in the monitor terminal, and is then stored in the monitor terminal operating data block 23. The operational data managing block 22 of the preferred embodiment, however, process the received message differently.

Figure 4:
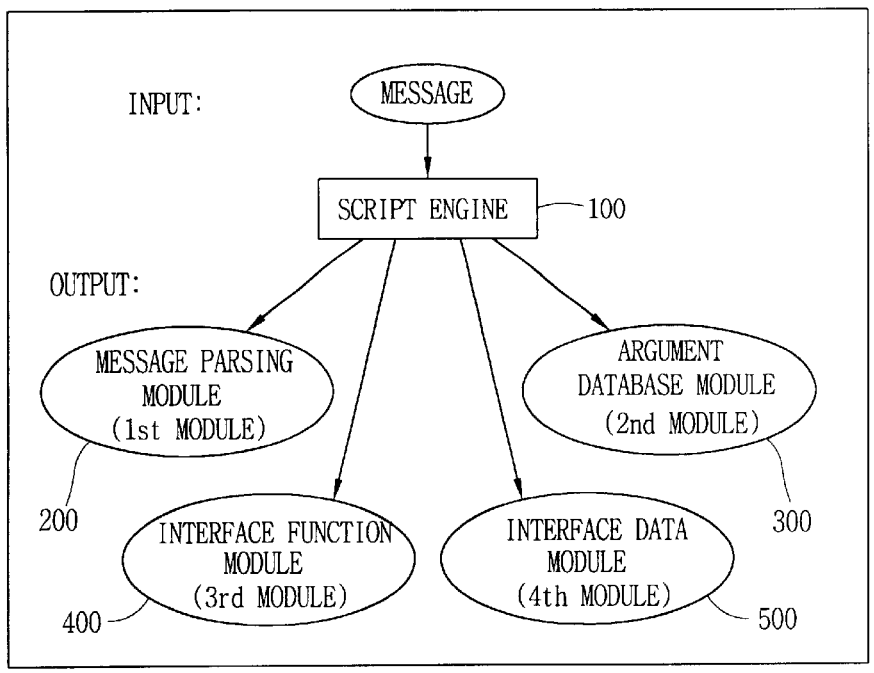
FIG. 4 is a diagram showing a construction of a plurality of modules that are automatically generated in a script engine of FIG. 3.

FIG. 4 shows a construction of a plurality of modules that are automatically generated by a script engine 100 of the preferred embodiment. As shown in FIG. 4, when the script engine 100 receives a message script file, it classifies the entire function related to processing a received message of the monitor terminal by functions that can be separated and automated. This is preferably one using modules. Specifically, the modules include a message parsing module 200, an argument database module 300, an interface function module 400, and an interface data module 500.

The message parsing module 200 performs a series of processing steps of parsing a received message from the communication operating system 10, calling a corresponding message processing function, and generating and transmitting a function argument.

The argument database module 300 includes information (for example, meta information) for processing data, which helps a coder to easily understand.

The interface function module 400 has a correlation with each message transmitted from the communication operating system 10 and reorganizes (i.e., formats) the received data as a real argument to an operation data adoptable to a software system that is driven in the monitor terminal. That is, it formats the data to match a prescribed protocol.

The interface data module 500 provides the interface function module 400 with additional information on a data structure as required when the interface function module 400 reorganizes the received data to an operation data adoptable to a software system that is driven in the monitor terminal.

The received message is processed by using the thusly generated software system structure by parsing the received message by the message parsing module 200, determining a message processing function to be called, generating a real argument to be passed to the message processing function and calling a message processing function. In this respect, when generating the real argument, the message parsing module 200 consults the information of the argument database module 300.

When a corresponding message processing function is called by the message parsing module 200 among the plurality of message processing functions included in the interface function module 400, the called message processing function reorganizes the real argument as received to an optional data adoptable to the software system driven in the monitor terminal 20. At this time, the interface function module 400 receives additional information on the data structure required for reorganizing the operational data.

Figure 3:
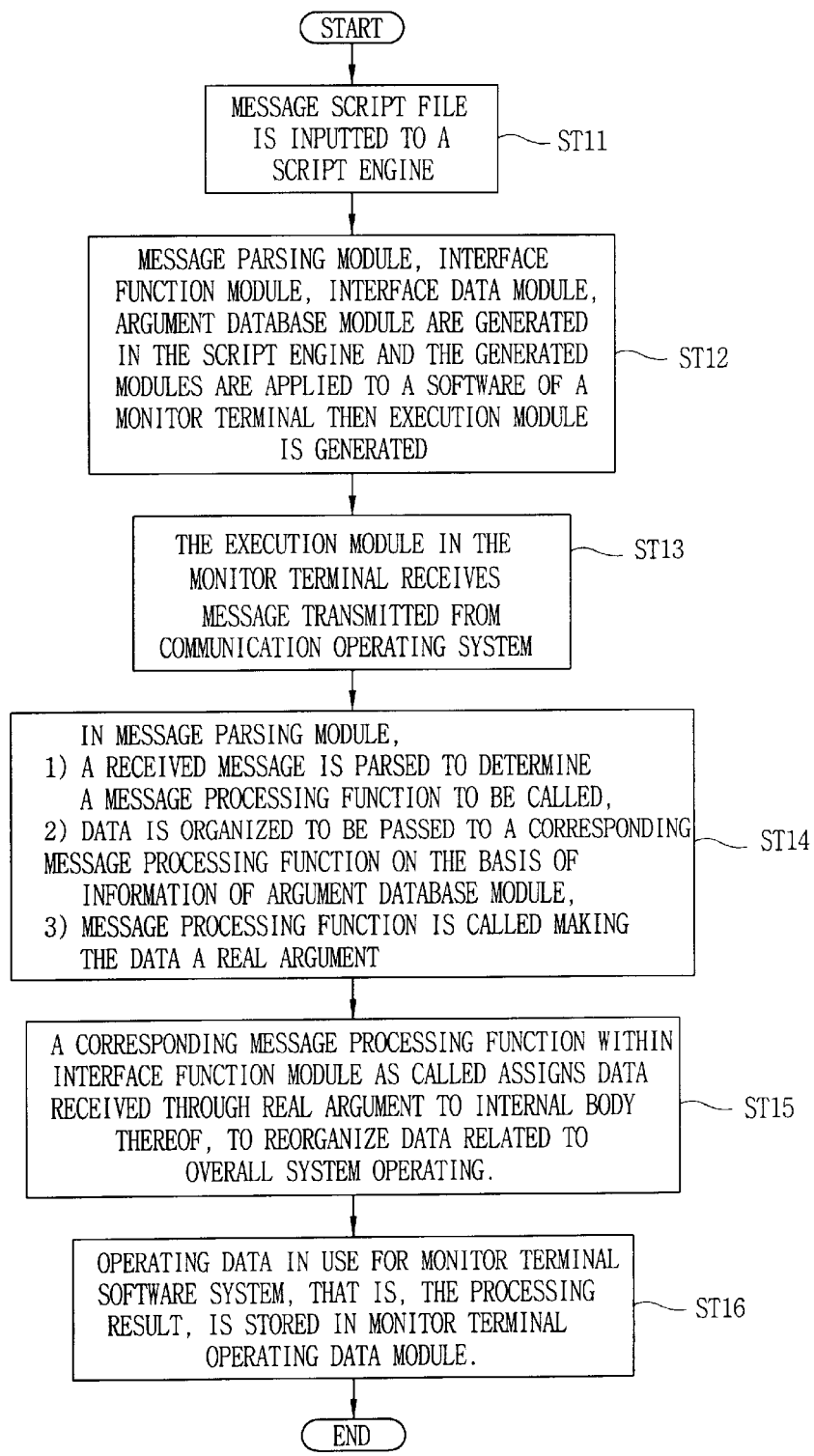
FIG. 3 is a diagram illustrating a method of processing a received message of the monitor terminal in accordance with a preferred embodiments of the present invention.

Referring to FIG. 3, the method for processing a received message of a monitor terminal in accordance with a preferred embodiment of the present invention will now be described. First, a message standard (for example, a Man-Machine Language or TL1 standard) adopted by the communication operating system 10 is edited fitting a script input form. When a thusly generated text file, for example the message script file, is received by the script engine 100, the script engine 100 generates the message parsing module 200, the argument database module 300, the interface function module 400, and the interface data module 500, as shown in steps ST11 and ST12.

Thereafter, when the command response message or the automatic report message is transmitted from the communication operating system 10, the operating data managing block 22 of the monitor terminal 20 receives the message through the received message processing block 21. Then, the message parsing module 200 of the operating data managing block 22 receives the message through buffering from the communication operating system 10, a shown in step ST13.

Figure 5:
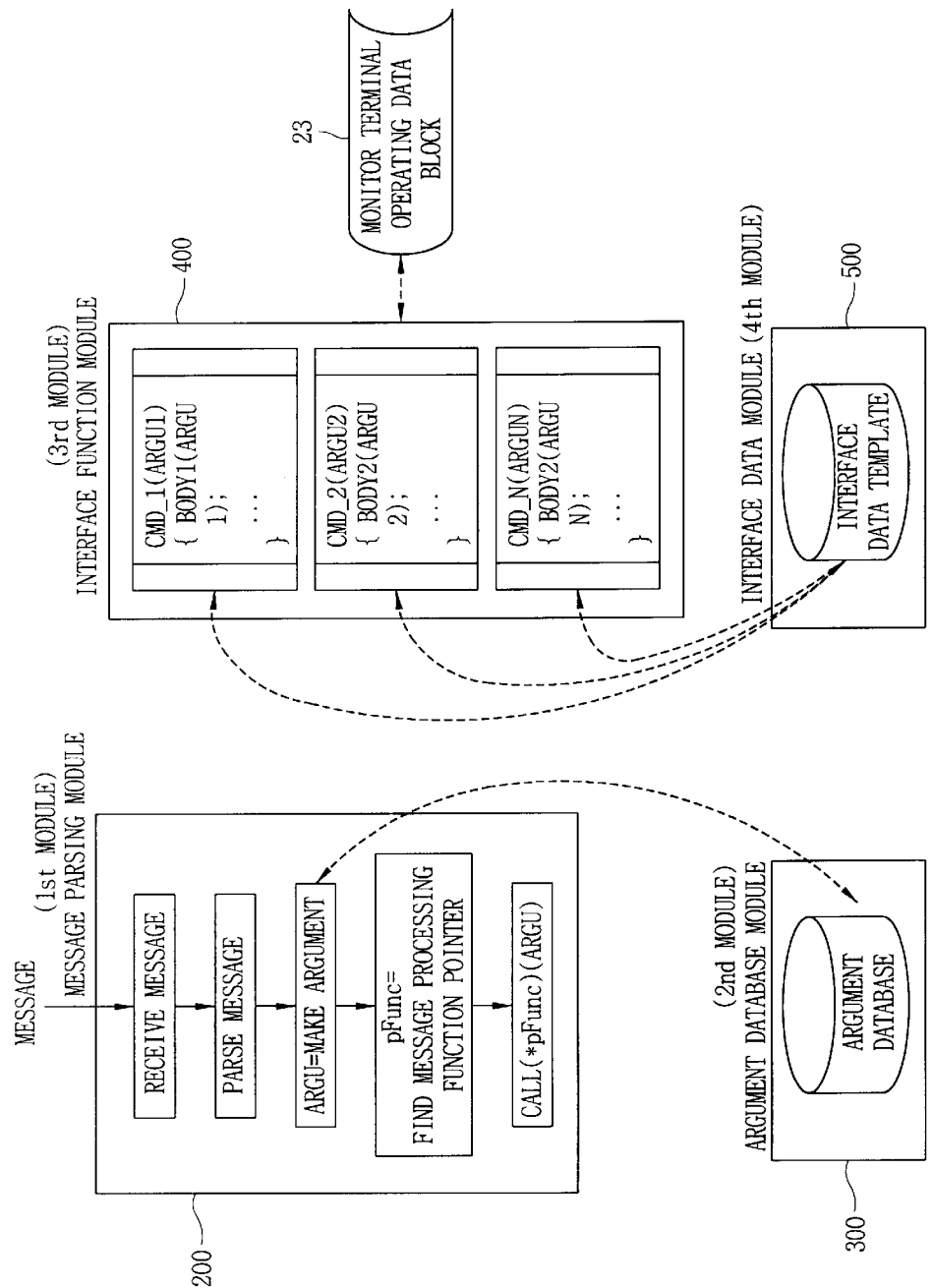
FIG. 5 is a diagram showing an internal structure and execution flow of each module as generated in FIG. 4.

Next, as shown in FIG. 5, by parsing the received message, the message type and the data are classified and reorganized. Accordingly, the message parsing module 200 organizes the real argument to be passed when a corresponding function is called. It does this by using the classified and reorganized data. At this time, the argument information is organized by referring to the argument data module 300.

The message parsing module 200 then determines a message processing function to process the data as classified and reorganized by parsing the received message. That is, the message parsing module 200 obtains a pointer of the message processing function to be called. The message processing function is one of the plurality of message processing functions included in the interface function module 400.

After determining the message processing function to be called and the organizing argument information to be passed to the function, the message parsing module 200 calls a corresponding message processing function, as shown in step ST14.

Preferably, when the monitor terminal 20 transmits a specific command 'CMD_1' to the communication operating system 10, the communication operating system 10 transmits a corresponding command response message to the monitor terminal 20. Then, a CMD_1(argument) function (which is a function to process the corresponding command response message) of the interface function module 400 is called through the message parsing module 200 of the monitor terminal 20.

The called message of processing function passes the data (the real argument) received from the message parsing module 200, as is, to its internal body as an argument without re-parsing it. Accordingly, the data by the message processing and the operational data in use for the monitor terminal software system are mapped as shown in step ST15.

In this manner, the interface function module 400 converts the data received as the real argument to an operational data form suitable to be used in the software system such as a GUI or equipment management system (EMS) driven in the monitor terminal 20. This data is then stored in the monitor terminal operating data block 23, as shown in step ST16.

The system and method for processing a received message of a monitor terminal of the present invention has several advantages. For example, the message script file is inputted to the script engine and the whole function related to processing the received message is classified by functions that can be separated and automated to thereby automatically generate a plurality modules. Thus, the modules for each function have an effect that a problem can be easily solved by module as it occurs.

Additionally, the processes of parsing the message received form the communication operating system, calling the command response processing function, generating the function argument and its transmitting are effectively performed by using the automatically generated message parsing module.

Moreover, for the data as classified and reorganized by parsing the received message, an argument is organized on the basis of the information of the argument database module and is passed to the corresponding message processing function when the latter is called, so that there is no need to re-parse the argument in order to obtain a required data when the function processes the message. This simplifies the function of the message processing function.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A computerized method for processing a received message of a monitor terminal, comprising:

generating first, second, third, and fourth modules to process a message received from a script engine;

parsing the received message using the first module to determine a message processing function to be called in the third module;

generating a real argument to be passed to the message processing function on the basis of information of the second module and calling the message processing function; and formatting the real argument to a prescribed protocol supported by a software system that is driven in the monitor terminal on the basis of the message processing function of the called third module and information of the fourth module.

2. The method of claim 1, wherein the first module is a message parsing module that performs a series of processes of parsing a message received from a communication operating system, calling a corresponding message processing function, and generating and transmitting function argument.

3. The method of claim 1, wherein the second module is an argument database module that includes meta information on information to be passed as an argument of a called function.

4. The method of claim 1, wherein the third module is an interface function module that has a correlation with each message transmitted from a communication operating system and reorganizes the received data a real argument to an operation data adoptable to a software system that is driven in the monitor terminal.

5. The method of claim 1, wherein the fourth module is an interface data module that provides the third module with additional information on a data structure as required when the third function module formats the received data.

6. The method of claim 5, wherein the third module comprises an interface function mode.

7. The method of claim 1, wherein the data received from the first module includes all of the information to be processed by the message processing function, so that the message does not need to be re-parsed.

8. The method of claim 1, wherein the received message is received from a communication operating system.

9. A computerized method for processing a received message of a monitor terminal, comprising:

receiving a message and generating a message parsing module, an argument database module, an interface function module, and an interface data module;

parsing the received message by the message parsing module when the message is received from a communication operating system to determine a message processing function to be selected among a plurality of message processing functions included in the interface function module;

generating data to be passed to the selected message processing function and calling the message processing function by making the generated data as real argument based on information of the argument database module;

mapping the data according to the message processing function with the operational data in use for the software system of the monitor terminal by using the data as it is as transmitted from the message parsing module without re-parsing it; and storing the data as resulted by mapping in an operational data block of the monitor terminal.

10. The method of claim 9, further comprising generating a message script file upon receiving the message, wherein the message script file is a text file that is generated by editing a size of the message standard adopted to the communication operating system to be suitable to a script input form.

11. The method of claim 9, wherein the message parsing module performs a series of processes, including parsing the message received from the communication operating system, calling a corresponding message processing function, and generating and transmitting a function argument.

12. The method of claim 9, wherein the argument database module processes information to be passed to the called message processing function to user-friendly information and passes it as an argument of the called message processing function.

13. The method of claim 9, wherein the interface function module has a correlation with each message transmitted from the communication operating system and reorganizes the data received as the real argument to the operational data adoptable to the software system that is driven in the monitor terminal.

14. The method of claim 9, wherein the interface data module provides the interface function module with additional information on a data structure, as required, when the interface function module formats the received data to the operational data adoptable to the software system that is driven in the monitor terminal.

15. The method of claim 9, wherein the data received from the message parsing module comprises all of the information to be processed by the message processing function, so that the message does not need to be re-parsed.

16. The method of claim 9, wherein the real argument is formatted to a prescribed protocol.

17. A data processing system, comprising:

a message parsing module to process a received message from a script engine;

an argument database module to provide information for processing data;

an interface function module to format received data as a real argument having a prescribed protocol; and an interface data module to provide the interface function module with data structure information, wherein a script engine forms the message parsing module, the argument database module, the interface function module, and the interface data module when the message is received, and wherein the message parsing module calls a message processing function and generates a function argument according to information in the argument database module.

18. The system of claim 17, wherein the message parsing module classifies and reorganizes a message type and message data of the received message.

19. The system of claim 17, wherein the read argument is formatted to a prescribed protocol in accordance with the message processing function.

20. A computerized method of processing a message received from a script engine, comprising:

receiving the message from a communication operating system;

parsing the received message to determine a message processing function to be called;

calling the message processing function that corresponds to the parsed message;

generating a real function argument to be used by the processing function by consulting information in an argument database module; and formatting the real function argument to a prescribed protocol in accordance with the message processing function.

21. The method of claim 20, wherein the parsed message provides a pointer of the message processing function to be called.

22. The method of claim 20, wherein parsing the received message comprises classifying and reorganizing a message type and message data.

* * * * *